United States Patent [19]

Ito

[11] Patent Number: 5,032,732

[45] Date of Patent: Jul. 16, 1991

[54] RADIATION IMAGE STORAGE PANEL AND PROCESS FOR THE PREPARATION OF THE SAME

[75] Inventor: Yoshiteru Ito, Kaisei, Japan

[73] Assignee: Fuji Photo Film Co., Ltd., Kanagawa, Japan

[21] Appl. No.: 512,163

[22] Filed: Apr. 20, 1990

[30] Foreign Application Priority Data

Apr. 20, 1989 [JP] Japan .......................... 1-100818

[51] Int. Cl.[5] .......................... G01N 21/64

[52] U.S. Cl. .......................... 250/484.1; 250/327.2

[58] Field of Search .......................... 250/327.2, 484.1

[56] References Cited

U.S. PATENT DOCUMENTS

| | | | |
|---|---|---|---|
| 4,855,191 | 8/1989 | Arakawa et al. | 250/483.1 |
| 4,950,559 | 8/1990 | Arakawa et al. | 250/483.1 B |

*Primary Examiner*—Constantine Hannaher

*Assistant Examiner*—Drew A. Dunn

*Attorney, Agent, or Firm*—Sixbey, Friedman, Leedom & Ferguson

[57] ABSTRACT

Disclosed is a radiation image storage panel having on a support a stimulable phosphor layer comprising a binder and a stimulable phosphor dispersed therein and a light-reflecting layer comprising a binder and a light-reflecting material dispersed therein, said stimulable phosphor layer and said light-reflecting layer being combined via an adhesive layer, wherein any interfaces between the adhesive layer and the stimulable phosphor layer and between the adhesive layer and the light-reflecting layer are not substantially formed. Also disclosed is a process for the preparation of the radiation image storage panel wherein a dispersion of a light-reflecting material in a binder solution, a coating solution for the formation of an adhesive layer and a dispersion of a stimulable phosphor in a binder solution are applied in a superposed form in the foregoing order onto a surface of a support or a sheet, to form a light-reflecting layer, an adhesive layer and a stimulable phosphor layer simultaneously.

2 Claims, 1 Drawing Sheet

RADIATION IMAGE STORAGE PANEL AND PROCESS FOR THE PREPARATION OF THE SAME

FIELD OF THE INVENTION

The present invention relates to a radiation image storage panel employable in a radiation image recording and reproducing method utilizing a stimulable phosphor, and a process for the preparation of the same. More particularly, the invention relates to a radiation image storage panel comprising a support, a light-reflecting layer, an adhesive layer and a stimulable phosphor layer, superposed in this order, and a process for the preparation of the same.

BACKGROUND OF THE INVENTION

For obtaining a radiation image, there has been recently proposed and practically used a radiation image recording and reproducing method utilizing a stimulable phosphor as described, for example, in U.S. Pat. No. 4,239,968. In the method, a radiation image storage panel comprising a stimulable phosphor (i.e., stimulable phosphor sheet) is used, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals. After the reading procedure, a radiation image remaining in the radiation image storage panel is erased from the panel, and the panel is stored for the next radiographic process.

In the radiation image recording and reproducing method, a radiation image is obtainable with a sufficient amount of information by applying a radiation to an object at a considerably smaller dose, as compared with the conventional radiography using a combination of a radiographic film and a radiographic intensifying screen. Further, the method is very advantageous from the viewpoints of conservation of resources and economic efficiency because the radiation image storage panel can be repeatedly used in the method, while the radiographic film is consumed for each radiographic process in the conventional radiography.

In the method, as described above, a radiation image can be obtained with a sufficient amount of information by applying a radiation to an object at a small dose, so that this method is of great value especially when the method is used for medical diagnosis.

The radiation image storage panel employed in the above-described method has a basic structure comprising a support and a stimulable phosphor layer provided on one surface of the support. Further, a transparent film is generally provided on the free surface (surface not facing the support) of the phosphor layer to keep the phosphor layer from chemical deterioration or physical shock.

The stimulable phosphor layer comprises a binder and stimulable phosphor particles dispersed therein. The stimulable phosphor emits light (gives stimulated emission) when excited with stimulating rays such as visible light or infrared rays after having been exposed to a radiation such as X-rays. Accordingly, the radiation having passed through an object or having radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very useful for obtaining a radiation image as a visible image as described above, and it is desired for the radiation image storage panel used in the method to have a high sensitivity and provide an image of high quality (high sharpness, high graininess, etc.), as well as for a radiographic intensifying screen used in the conventional radiography. The radiation image storage panel is used repeatedly as mentioned before, so that the panel is also desired to be resistant to physical shock from the viewpoints of reliability of the resulting image data, economical efficiency and easy handling.

For enhancing the sensitivity of the radiation image storage panel, there has been known the art that a light-reflecting layer is provided between the support and the stimulable phosphor layer by depositing a metal such as aluminum on a surface of the support, laminating a metal foil such as an aluminum foil thereon, or applying a coating dispersion comprising a binder and a light-reflecting material thereonto. As for the light-reflecting material, titanium dioxide, white lead, zinc sulfide, aluminum oxide, magnesium oxide and alkaline earth metal fluorohalides are employed as described in U.S. Pat. Nos. 4,380,702 and 4,621,196. A light emitted by the stimulable phosphor in the phosphor layer and advancing towards the support is reflected by said layer and released from the phosphor layer-side surface of the panel. Accordingly, the light advancing towards the support is also detected to further increase the sensitivity of the panel.

However, there is a problem that air bubbles are likely produced on the interface between the light-reflecting layer and the stimulable phosphor layer in the course of forming them by coating the support successively with a coating dispersion comprising a binder and a light-reflecting material and a coating dispersion comprising a binder and a stimulable phosphor (i.e., successive coating method), and the bubbles affect a resulting image to cause lowering of image quality (unevenness of image density). It is assumed that bubbles are produced by the fact that a solvent in a coating dispersion for the formation of a phosphor layer permeates the light-reflecting layer in the course of coating the dispersion on the previously formed light-reflecting layer, and air dispersively contained in the light-reflecting layer is raised and forms the bubbles on the surface of the light-reflecting layer.

For solving the above problem, U.S. Pat. No. 4,791,196 proposes a process wherein a dispersion of a stimulable phosphor in a binder solution (i.e., coating solution for the formation of a stimulable phosphor) and a dispersion of a light-reflecting material in a binder solution (i.e., coating solution for the formation of a light-reflecting layer) are coated over a support in a superposed form, to form a stimulable phosphor layer and a light-reflecting layer simultaneously on the support. That is, the process utilizes a two-layer simultaneous superposition coating method. According to the two-layer simultaneous superposition coating method, a radiation image storage panel can be prepared by a simple process, and further a stimulable phosphor layer having a light-reflecting layer of high efficiency can be formed.

However, the radiation image storage panel is also de sired to be resistant to physical shock as well as to have a high sensitivity and give an image of high quality, as described hereinbefore.

The stimulable phosphor layer can be protected from chemical deterioration and physical shock by providing a transparent protective film as described above, but it is required to have increased adhesiveness (bonding strength) between the layers of the panel in order to prevent interfacial separation between these layers caused by the physical shock.

The radiation image storage panel prepared using the above-mentioned two-layer simultaneous superposition coating method is improved in the adhesion between the stimulable phosphor layer and the light-reflecting layer to a certain level, but the adhesion therebetween is required to be further increased in consideration of service conditions of the radiation image storage panel.

SUMMARY OF THE INVENTION

It is an object of the present invention to provide a radiation image storage panel having high resistance to physical shock as well as showing high sensitivity and providing a uniform image and a process for the preparation of the same, by improving the above-described two-layer simultaneous superposition coating method which is a method of preparing a radiation image storage panel showing high sensitivity and providing a uniform image.

It is another object of the present invention to provide a radiation image storage panel hardly bringing about interfacial separation between layers even under physical shock as well as showing high sensitivity and providing an image of high quality and a process for the preparation of the same, by improving the above-described two-layer simultaneous superposition coating method which is a method of preparing a radiation image storage panel showing high sensitivity and providing an image of high quality. There is provided by the present invention a radiation image storage panel having on a support a stimulable phosphor layer comprising a binder and a stimulable phosphor dispersed therein and a light-reflecting layer comprising a binder and a light-reflecting material dispersed therein, said stimulable phosphor layer and said light-reflecting layer being combined via an adhesive layer, wherein any interface between the adhesive layer and the stimulable phosphor layer and between the adhesive layer and the light-reflecting layer are not essentially formed.

The above-mentioned radiation image storage panel of the invention can be advantageously prepared by any of the following processes.

(1) A process for the preparation of a radiation image storage panel wherein a binder dispersion of a light-reflecting material in a binder solution, a coating solution for the formation of an adhesive layer and a dispersion of a stimulable phosphor in a binder solution are applied in a superposed form in the foregoing order onto a surface of a support in such a manner that the dispersion of a light-reflecting material is arranged on the support side to form a light-reflecting layer, an adhesive layer and a stimulable phosphor layer simultaneously.

(2) A process for the preparation of a radiation image storage panel wherein a binder dispersion of a light-reflecting material in a binder solution, a coating solution for the formation of an adhesive layer and a dispersion of a stimulable phosphor are applied in a superposed form in the foregoing order onto a surface of a plane sheet in such a manner that the dispersion of a stimulable phosphor in a binder solution is arranged on the sheet side to form a light-reflecting layer, an adhesive layer and a stimulable phosphor layer simultaneously; and the three layers superposed on the sheet are then separated from the sheet and combined with a support in such manner that the light-reflecting layer faces the support.

The expression "a coating dispersion of a light-reflecting material, a coating solution for the formation of an adhesive layer and a coating dispersion of a stimulable phosphor are applied in a superposed form to form layers simultaneously" (i.e., simultaneous superposition coating) used herein means not only that three kinds of coating solutions, namely, the dispersion of a light sensitive material, the coating solution for the formation of an adhesive layer and the dispersion of a stimulable phosphor, are coated on a support or a sheet at a time (simultaneously) in a superposed form and then dried, but also that the coating solutions are successively coated one after another on a support or a sheet and then dried together.

In the radiation image storage panel of the invention, if the binders contained in the three kinds of the coating solutions are compatible with each other, any apparent interface (boundary) is not formed between the light-reflecting layer and the adhesive layer as well as between the adhesive layer and the stimulable phosphor layer. Further, since the provision of the adhesive layer between the light-reflecting layer and the phosphor layer means that a binder is supplied to the vicinity of the interface between the light-reflecting layer and the phosphor layer, the bonding strength (adhesion) between those layers is enhanced, and hence the interfacial separation between those layers hardly occurs even if the panel is subjected to physical shock.

DETAILED DESCRIPTION OF THE INVENTION

Figure 1:
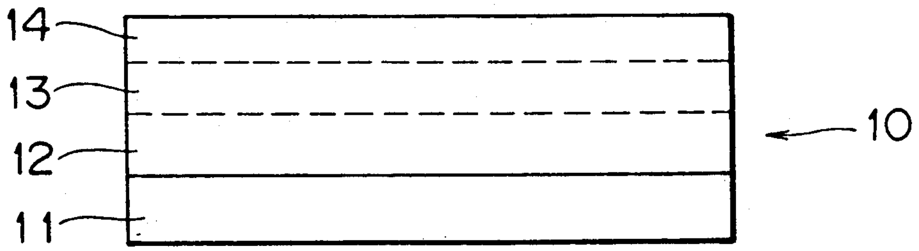
FIG. 1 shows a schematic view of the structure of the radiation image storage panel of the invention.

As is illustrated in FIG. 1, the radiation image storage panel 10 of the invention comprises a support 11, a light-reflecting layer 12, an adhesive layer 13, and a stimulable phosphor layer 14.

The radiation image storage panel of the present invention having the above-described favorable features can be prepared, for example, by the following process. The simultaneous superposition coating of a light-reflecting layer, an adhesive layer and a stimulable phosphor layer, that is a characteristic requisite of the invention, can be made as follows.

The light-reflecting layer comprises a binder and particles of a light-reflecting material dispersed therein. The adhesive layer may contain only a binder, or may further contain other additives to make the layer have other functions, for example, the adhesive layer may contain a colorant to serve as a colored layer. The stimulable phosphor layer comprises a binder and stimulable phosphor particles dispersed therein.

In the first place, a particulate light-reflecting material is homogeneously dispersed in a binder solution to prepare a dispersion for the formation of a light-reflecting layer (referred to as "coating solution I" hereinafter).

Examples of the light-reflecting materials include white pigments such as $Al_2O_3$, $ZrO_2$, $TiO_2$, $BaSO_4$, $SiO_2$, ZnS, ZnO, MgO, $CaCO_3$, $Sb_2O_3$, $Nb_2O_5$, $2PbCO_3.Pb(OH)_2$, $M^{II}FX$ (wherein $M^{II}$ is at least one element selected from the group consisting of Ba, Ca and Sr; and X is Cl and/or Br), lithopone ($BaSO_4+ZnS$), magnesium silicate, basic lead silicosulphate, basic lead phosphate and aluminum silicate; and polymer particles of hollow structure (polymer pigment).

The hollow polymer particles are made of a styrene polymer or a styrene-acrylic copolymer. The outer diameter of the hollow polymer particle is in the range of 0.2 to 1 μm, and the diameter of hollow (inner diameter) is in the range of 0.05 to 0.7 μm. Details of utilization of the hollow polymer particles are described in copending U.S. patent application Ser. No. 940,416.

Among the above-mentioned light-reflecting materials, preferably employed in the invention are $Al_2O_3$, $ZrO_3$, $TiO_2$, $BaSO_4$, $SiO_2$, ZnS, ZnO and $M^{II}FX$ (wherein $M^{II}$ and X have the same meanings as defined above). The light-reflecting materials may be used singly or in combination of two or more of them.

The coating solution I is prepared by adding particles of the light-reflecting material and a binder to an appropriate solvent and sufficiently mixing them. As the binder and the solvent, there can be employed binders and solvents employable in a coating solution for the formation of an adhesive layer (the solution is referred to hereinafter as "coating solution II") and a dispersion for the formation of a stimulable phosphor layer (the dispersion is referred to hereinafter as "coating solution III"). Details of the coating solution II and the coating solution III will be described later. When the light-reflecting material is hollow polymer particles, the binder may be an water soluble polymer such as an acrylic acid copolymer. The coating solution I may further contain various additives such as a dispersing agent, a plasticizer and a colorant which can be employed in the coating solution II and the coating solution III.

The ratio between the binder and the light-reflecting material in the coating solution I is generally within the range of from 2:1 to 1:20 (binder:light-reflecting material, volume ratio). The ratio therebetween is preferably within the range of from 1:1 to 1:10, volume ratio, from the viewpoint of the adhesion between a support and the light-reflecting layer.

In the second place, a coating solution II for the formation of an adhesive layer is prepared.

The coating solution II basically comprises a binder and a solvent. If the adhesive layer also serves as other functional layers such as a colored layer, the coating solution II may contain other additives such as a colorant and a dispersing agent. The binder and the solvent used in the coating solution II can be selected from those employable in the above-mentioned coating solution I and the later-mentioned coating solution III.

In the next place, stimulable phosphor particles are homogeneously dispersed in a binder solution to prepare a dispersion for the formation of a stimulable phosphor layer (i.e., coating solution III).

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphors employable in the radiation image storage panel of the invention include:

SrS:Ce,Sm, SrS:Eu,Sm, $ThO_2$:Er, and $La_2O_2S$:Eu,Sm;

ZnS:Cu,Pb, $BaO.xAl_2O_3$:Eu, in which x is a number satisfying the condition of $0.8 \leqq x \leqq 10$, and $M^{II}O.xSiO_2$:A, in which $M^{II}$ is at least one divalent metal element selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$ and $xy \neq 0$, and a is a number satisfying the condition of $10^{-6} \leqq a \leqq 5 \times 10^{-2}$;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$;

$(Ba_{1-x}, M^{II}_x)FX:yA$, in which $M^{II}$ is at least one divalent metal element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and ThO; *Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of* $5 \times 10^{31} {}^5 \leqq x \leqq 0.5$ and $0 \leqq y \leqq 0.2$, respectively;

$(Ba_{1-x}, M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x < 1$, $10^{-6} \leqq y \leqq 2 \times 10^{-1}$, and $0 < z \leqq 10^{-2}$, respectively;

$(Ba_{1-x},M^{II}x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 < x \leqq 1$, $10^{-6} \leqq y \leqq 2 \times 10^{-1}$, and $0 \leqq z \leqq 2 \times 10^{-1}$, respectively;

$(Ba_{1-x}, M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 5 \times 10^{-1}$, respectively;

$M^{III}OX$:xCe, in which $M^{III}$ is at least one trivalent metal element selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$;

$Ba_{1-x}M_{x/2}L_{x/2}FX:yEu^{2+}$, in which M is at least one alkali metal element selected from the group consisting of Li, Na, K, Rb and Cs; L is at least one trivalent metal element selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0 < y \leqq 0.1$, respectively;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0 < y \leqq 0.1$, respectively;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 < y \leqq 0.1$, respectively;

$BaFX.xNaX':aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively;

$M^{II}FX.xNaX':yEu^{2+}:zA$, in which $M^{II}$ is at least one alkaline earth metal element selected from the group consisting of Ba, Sr and Ca; each of X and X, is at least one halogen selected from the group consisting of Cl, Br and I; A is at least one transition metal element selected from the group consisting of V, Cr, Mn, Fe, Co and Ni; and x, y and z are numbers satisfying the conditions of $0 < x \leqq 2$, $0 < y \leqq 0.2$ and $0 < z \leqq 10^{-2}$, respectively;

$M^{II}FX.aM^{I}X'.bM'^{II}X''_2.cM^{III}X'''_3.xA:yEu^{2+}$, in which $M^{II}$ is at least one alkaline earth metal element selected from the group consisting of Ba, Sr and Ca; $M^{I}$ is at least one alkali metal element selected from the group consisting of Li, Na, K, Rb and Cs; $M^{III}$ is at least one divalent metal element selected from the group consisting of Be and Mg; $M^{III}$ is at least one trivalent metal element selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$; and x and y are numbers satisfying the conditions of $0 < x \leqq 0.5$ and $0 < y \leqq 0.2$, respectively;

$M^{II}X_2.aM^{II}X'_2:Eu^{2+}$, in which $M^{II}$ is at least one alkaline earth metal element selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0 < x \leqq 0.2$, respectively;

$M^{II}FX.aM^{I}X':xEu^{2+}$, in which $M^{II}$ is at least one alkaline earth metal element selected from the group consisting of Ba, Sr and Ca; $M^{I}$ is at least one alkali metal element selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leqq 4.0$ and $0 < x \leqq 0.2$, respectively; and $M^{I}X$:xBi, in which $M^{I}$ is at least one alkali metal element selected from the group consisting of Rb and Cs; X is at least one halogen selected from the group consisting of Cl, Br and I; and x is a number satisfying the condition of $0 < x \leqq 0.2$.

The $M^{II}X_2.aM^{II}X'_2:xEu^{2+}$ phosphor may further contain the following additives for 1 mol of $M^{II}X_2.aM^{II}X'_2$:

$bM^{I}X''$, in which $M^{I}$ is at least one alkali metal element selected from the group consisting of Rb and Cs; X'' is at least one halogen selected from the group consisting of F, Cl, Br and I; and b is a number satisfying the condition of $0 < b \leqq 10.0$;

$bKX''.cMgX'''_2.dM^{III}X''''_3$, in which $M^{III}$ is at least one trivalent metal element selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leqq b \leqq 2.0$, $0 \leqq c \leqq 2.0$ and $0 \leqq d \leqq 2.0$, and $2 \times 10^{-5} \leqq b+c+d$;

bA, in which A is at least one oxide selected from the group consisting of $SiO_2$ and $P_2O_5$; and b is a number satisfying the condition of $10^{-4} \leqq b \leqq 2 \times 10^{-1}$;

yB (boron), in which y is a number satisfying the condition of $2 \times 10^{-4} \leqq b \leqq 2 \times 10^{-1}$;

bSiO, in which b is a number satisfying the condition of $0 < b \leqq 3 \times 10^{-2}$;

$bSnX''_2$, in which X'' is at least one halogen selected from the group consisting of F, Cl, Br and I; and b is a number satisfying the condition of $0 < b \leqq 10^{-3}$;

$bCsX''.cSnX'''_2$, in which each of X'' and X''' is at least one halogen selected from the group consisting of F, Cl, Br and I; and b and c are numbers satisfying the conditions of $0 < b \leqq 10.0$ and $10^{-6} \leqq c \leqq 2 \times 10^{-2}$, respectively; and $bCsX''.yLn^{+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leqq 10.0$ and $10^{-6} \leqq y \leqq 1.8 \times 10^{-1}$, respectively.

Among the above-described stimulable phosphors, the divalent europium activated alkaline earth metal halide phosphor and the rare earth element activated rare earth oxyhalide phosphor are particularly preferred, because they show stimulated emission of high luminance. The above-described stimulable phosphors are by no means given to restrict the stimulable phosphor employable in the present invention, and any other phosphors can be also employed, provided that the phosphor gives stimulated emission when excited with stimulating rays after exposure to a radiation.

Examples of the binders employable in the coating solution III for the formation of a stimulable phosphor layer include: natural polymers such as proteins (e.g., gelatin), polysaccharides (e.g., dextran) and gum arabic;

and synthetic polymers such as polyvinyl butyral, polyvinyl acetate, nitrocellulose, ethyl cellulose, vinylidene chloride.vinyl chloride copolymer, polyalkyl (meth)acrylate, vinyl chloride.vinyl acetate copolymer, polyurethane, cellulose acetate butyrate, polyvinyl alcohol and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

Examples of the solvents employable in the preparation of the coating solution III include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether and ethylene glycol monomethyl ether; and mixtures of the above-mentioned compounds.

The coating solution III is prepared by adding the stimulable phosphor particles and the binder to the solvent and sufficiently mixing them.

The ratio between the binder and the stimulable phosphor in the coating solution III may be determined according to the characteristics of the aimed radiation image storage panel and the nature of the employed stimulable phosphor. Generally, the ratio therebetween is in the range of from 5:1 to 1:30 (binder:phosphor, in volume), preferably in the range of from 1:1 to 1:25, in volume.

The coating solution III may contain various additives such as a dispersing agent to improve the dispersibility of the phosphor particles therein and a plasticizer to increase the bonding between the binder and the phosphor particles in the resulting phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate, and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating solution III may further contain such a colorant that the mean reflectance thereof in the wavelength region of stimulating rays for the stimulable phosphor is lower than the mean reflectance thereof in the wavelength region of light emitted by the stimulable phosphor upon excitation thereof, to enhance the sharpness of an image provided by the resulting panel. Examples of the colorant include those disclosed in U.S. Pat. No. 4,394,581 and U.S. patent application Ser. No. 326,642, now U.S. Pat. No. 4,491,736. The coating dispersion III may also contain such a white powder as described in U.S. Pat. No. 4,350,893 for the same purpose.

The binder used in the coating solution I for the formation of a light-reflecting layer may or may not be compatible with the binder used in the coating solution II for the formation of an adhesive layer, and preferably they are le with each other, more preferably the same as each other. Further, the binder used in the coating solution II may or may not be compatible with the binder used in the coating solution III for the formation of a stimulable phosphor layer, and preferably they are compatible with each other, more preferably the same as each other. Furthermore, all of the binders used in the coating solutions I, II and III preferably are compatible with each other, and most preferably they are the same as each other.

The solvents used in the coating solutions I, II and III may be the same or different from each other. Preferably, they are compatible with each other, more preferably the same as each other, because the layers coated in a superposed form are required to be dried at the same rate.

The coating solution I, the coating solution II and the coating solution III are evenly coated on a surface of a support at one time (simultaneously) in the superposed form arranging the coating solution I on the support side, to form coated layers of the solutions. This coating can be conducted, for example, by using a three-hopper type coating apparatus. Otherwise, the coating solution I is first coated on a surface of a support, then the coating solution II is immediately coated thereon while preventing the solvent of the solution I from releasing (evaporation), and the coating solution III is then immediately coated on the coated layer of the solution II while preventing the solvent of the solution II from releasing (evaporation). In this case, the coating can be conducted, for example, by using a doctor blade, a roll coater or a knife coater.

Subsequently, the coated layers of the coating solutions I, II and III are together heated slowly to dryness in a simultaneous stage, so as to complete the formation of a light-reflecting layer, an adhesive layer and a stimulable phosphor layer on a support. When the binders contained in those three layers are compatible with each other, the formed three layers cannot be distinguished by any interface (boundary) even by visually observing with an electron microscope.

The light-reflecting layer, the adhesive layer and the stimulable phosphor layer can be provided on a support by the method other than that given in the above. For example, the coating solution I, the coating solution II and the coating solution III are applied in a superposed form onto a plane sheet (false support) in such a manner that the coating solution III is arranged on the sheet side to form a light-reflecting layer, an adhesive layer and a stimulable phosphor layer simultaneously on the sheet, and then thus formed three layers are separated from the sheet and combined with a genuine support by pressing or using an adhesive agent.

Each thickness of the light-reflecting layer, the adhesive layer and the stimulable phosphor layer varies depending on the characteristics of the aimed radiation image storage panel, the nature of the phosphor, the ratio between the binder and the light-reflecting material, the ratio between the binder and the phosphor, etc. The thickness of the light-reflecting layer preferably is in the range of 5 to 100 μm, and the thickness of the adhesive layer preferably is in the range of 1 to 100 μm. The thickness of the stimulable phosphor layer generally is in the range of 20 μm to 1 mm, preferably in the range of 50 to 500 μm. However, the value of the thickness of each layer is that in the case that an imaginary boundary is presumed between layers.

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material and handling properties, a plastic film is preferably employed as the support material in the invention. The plastic film may contain a light-absorbing material such as carbon black.

On the support of the radiation image storage panel of the invention, a subbing layer may be provided by coating a polymer material such as gelatin to enhance the adhesion between the support and the light-reflecting layer, or an antistatic layer composed of a conductive material such as $In_2O_3$ and $SnO_2$ may be provided to improve antistatic properties of the panel.

As described in U.S. patent application Ser. No. 496,278 now U.S. Pat. No. 4,575,635, the light-reflecting layer-side surface of the support (or the surface of a subbing layer or antistatic layer in the case that such layers are provided on the support) may be provided with protruded and depressed portions for enhancement of the sharpness of an image provided by the resulting panel. A transparent protective film may be provided on the surface of the stimulable phosphor layer to protect the phosphor layer from physical and chemical deterioration.

The protective film can be provided on the phosphor layer by evenly coating the surface of the phosphor layer using a doctor blade or the like with a solution prepared by dissolving an organic polymer material such as a cellulose derivative (e.g., cellulose acetate or nitrocellulose) or a synthetic polymer (e.g., polymethyl methacrylate, polyvinyl butyral, polyvinyl formal, polycarbonate, polyvinyl acetate or vinyl chloride-vinyl acetate copolymer) in an appropriate solvent, and drying the coated solution. Alternatively, the protective film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The thickness of the transparent protective film is preferably in the range of 0.1 to 20 μm.

The examples of the present invention and the comparison examples are given below, but the examples are construed by no means to restrict the invention.

EXAMPLE 1

Aluminum oxide particles ($Al_2O_3$, mean diameter: 1.0 μm), a binder composed of a polyalkyl methacrylate resin, isocyanate and nitrocellulose (nitration degree: 11.5%) and tricresyl phosphate (plasticizer) were added to methyl ethyl ketone, and they were mixed using a propeller mixer to prepare a dispersion of a white pigment (i.e., coating solution I) having a mixing ratio of 1:7 (binder:white pigment, volume ratio) and a viscosity of 25-35 PS (25° C.).

Independently, the above-mentioned polyalkyl methacrylate (binder) was added to methyl ethyl ketone to prepare a 10% binder solution in methyl ethyl ketone (i.e., coating solution II).

Separately, divalent europium activated barium fluorobromide ($BaFBr:Eu^{2+}$) stimulable phosphor particles, the above binder and the above plasticizer were added to methyl ethyl ketone, and they were mixed using a propeller mixer to prepare a dispersion of the stimulable phosphor (i.e., coating solution III) having a mixing ratio of 1:25 (binder:phosphor, volume ratio) and a viscosity of 25-35 PS (25° C.).

Subsequently, the coating solution I was evenly coated over a polyethylene terephthalate sheet containing carbon black (support, thickness: 250 μm, tradename: X-30, available from Toray Industries, Inc.) placed horizontally on a glass plate by means of a doctor blade. Then, the coating solution II was immediately coated on the layer of the coating solution I in a superposed form in the same manner as described above before the solvent of the coating solution I did not evaporate from the layer, and then the coating solution III was immediately coated on the layer of the coating solution II in a superposed form in the same manner as described above before the solvent of the coating solution II did not evaporate from the layer. After the coating procedure, the support provided with the layers of the coating solutions I, II and III was placed in an oven and heated slowly at a temperature gradually rising from 25° to 100° C. to dry the layers. Thus, a light-reflecting layer having a thickness of 30 μm, an adhesive layer having a thickness of 10 μm and a stimulable phosphor layer having a thickness of 250 μm were formed on the support.

Then, on the stimulable phosphor layer was placed a transparent polyethylene terephthalate film (protective film, thickness: 10 μm, provided with a polyester adhesive agent) to combine the transparent film and the phosphor layer with the adhesive agent. Thus, a radiation image storage panel consisting essentially of a support, a light-reflecting layer, an adhesive layer, a stimulable phosphor layer and a protective film, superposed in this order, was prepared.

COMPARISON EXAMPLE 1

The procedures of Example 1 were repeated except for not coating the coating solution II, to prepare a radiation image storage panel consisting essentially of a support, a light-reflecting layer, a stimulable phosphor layer and a protective film, superposed in this order.

COMPARISON EXAMPLE 2

The procedures of Comparison Example 1 were repeated except for varying the mixing ratio between the binder and the white pigment in the coating solution I to 1:5 (binder:white pigment, in volume) and varying the mixing ratio between the binder and the stimulable phosphor in the coating solution III to 1:20 (binder:phosphor, volume ratio), to prepare a radiation image storage panel consisting essentially of a support, a light-reflecting layer, a stimulable phosphor layer and a protective film, superposed in this order.

Evaluation of Radiation Image Storage Panel

The radiation image storage panels obtained in Example 1 and Comparison Examples 1 and 2 were evaluated on the shock resistance (i.e., tendency of interfacial separation between layers) by the following shock test.

Each of the radiation image storage panels was transferred at a rate of 4 m/second to make the panel collide with a metal strip. Then, the tendency of separation between the light-reflecting layer and the stimulable phosphor layer was observed through viewing.

The results are set forth in Table 1.

TABLE 1

| Tendency of Interfacial Separation | |
|---|---|
| Example 1 | not observed |
| Com. Ex. 1 | observed |
| Com. Ex. 2 | slightly observed |

As is evident from the results set forth in Table 1, any interfacial separation between the light-reflecting layer and the stimulable phosphor layer did not occur in the radiation image storage panel of the present invention (panel of Example 1) even against the shock, while slight separation occurred between those layers in the panels provided with no adhesive layer (panels of Comparison Examples 1 and 2, that is, unimproved panels). Accordingly, it was confirmed that the radiation image storage panel of the invention had a high resistance to physical shock.

I claim:

1. A radiation image storage panel having on a support a stimulable phosphor layer comprising a binder and a stimulable phosphor dispersed therein and a light-reflecting layer comprising a binder and a light-reflecting material therein, said stimulable phosphor layer and said light-reflecting layer being combined via an adhesive layer, wherein any interface between the adhesive layer and the stimulable phosphor layer and between the adhesive layer and the light-reflecting layer is not substantially formed.

2. The radiation image storage panel as claimed in claim 1, wherein the light-reflecting material is at least one white pigment selected from the group consisting of $Al_2O_3$, $ZrO_2$, $TiO_2$, $BaSO_4$, $SiO_2$, ZnS, ZnO and $M^{II}FX$ in which $M^{II}$ is at least one element selected from the group consisting of Ba, Ca and Sr, and X is Cl and/or Br.

* * * * *